US008933655B2

(12) United States Patent
Savio et al.

(10) Patent No.: US 8,933,655 B2
(45) Date of Patent: Jan. 13, 2015

(54) EQUIPMENT AND METHOD FOR MEASURING THE OFFSET ANGLE OF A RESOLVER IN A SYNCHRONOUS ELECTRIC MACHINE

(75) Inventors: Cédric Savio, Clermont-Ferrand Cedex (FR); Jean-Louis Linda, Clermont-Ferrand Cedex (FR); Bertrand Vedy, Clermont-Ferrand Cedex (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 247 days.

(21) Appl. No.: 13/698,842

(22) PCT Filed: May 5, 2011

(86) PCT No.: PCT/EP2011/057228
§ 371 (c)(1),
(2), (4) Date: Dec. 12, 2012

(87) PCT Pub. No.: WO2011/144457
PCT Pub. Date: Nov. 24, 2011

(65) Prior Publication Data
US 2013/0106325 A1    May 2, 2013

(30) Foreign Application Priority Data
May 21, 2010 (FR) ...................... 10 53962

(51) Int. Cl.
*H02P 21/00* (2006.01)
*H02P 6/16* (2006.01)
(52) U.S. Cl.
CPC .............. *H02P 6/16* (2013.01); *H02P 21/0035* (2013.01)

USPC ...... 318/400.02; 318/605; 318/608; 318/609; 318/610; 318/661; 318/721; 318/801
(58) Field of Classification Search
USPC ............ 318/400.02, 605, 608, 609, 610, 661, 318/400.01, 721, 799, 801, 400.14, 400.15, 318/432; 708/441, 809; 341/112, 116, 117
See application file for complete search history.

(56) References Cited

U.S. PATENT DOCUMENTS

| 6,646,571 B1 | 11/2003 | Soar et al. .................. 341/13 |
| 6,657,356 B2 | 12/2003 | Laurent et al. ............. 310/254 |

(Continued)

FOREIGN PATENT DOCUMENTS

| DE | 102 26 794 A1 | 1/2004 |
| DE | 103 15 754 A1 | 10/2004 |

(Continued)

*Primary Examiner* — Antony M Paul
(74) *Attorney, Agent, or Firm* — Fitzpatrick, Cella, Harper & Scinto

(57) ABSTRACT

An apparatus for measuring an error in a resolver includes a first calculator that perform an inverse Park transform based on voltages Uq and Ud at an output of PI current regulators, and delivers voltage setpoint signals $PWM_A$, $PWM_B$, $PWM_C$ to a power stage via a line on which a DC voltage Ubus-dc is available. The power stage generates a three-phase system of voltages $U_A$, $U_B$, $U_C$ for energizing an electric machine. The apparatus also includes a signal processor that provides an angle measurement $\alpha_m$. Based on currents $MesI_A$, $MesI_B$, $MesI_C$ of the three phases, and on a rotor angle $\alpha_r$, a second calculator of the device delivers values MesId, MesIq used by the first calculator. A PI voltage regulator delivers an angle $\alpha_c$ for correcting the error by regulating a setpoint value for the voltage Ud.

9 Claims, 4 Drawing Sheets

(56) References Cited

U.S. PATENT DOCUMENTS

| | | |
|---|---|---|
| 6,756,710 B2 | 6/2004 | Bourqui et al. ................. 310/44 |
| 7,733,044 B2 * | 6/2010 | Nakamura et al. ....... 318/400.02 |
| 2005/0219124 A1 | 10/2005 | Brambilla et al. ............ 343/700 |
| 2006/0125439 A1 | 6/2006 | Ajima et al. ................. 318/716 |
| 2009/0052209 A1 | 2/2009 | Kaitani et al. ................. 363/37 |
| 2011/0221290 A1 | 9/2011 | Vedy ............................... 310/71 |
| 2011/0227428 A1 | 9/2011 | Vedy et al. ..................... 310/43 |
| 2011/0241498 A1 | 10/2011 | Vedy et al. .................. 310/68 B |
| 2012/0249044 A1 | 10/2012 | Linda et al. ................... 318/722 |

FOREIGN PATENT DOCUMENTS

| | | |
|---|---|---|
| EP | 1 796 257 A1 | 6/2007 |
| GB | 2 438 411 A | 11/2007 |
| WO | WO 2010026159 A1 | 3/2010 |

* cited by examiner

EQUIPMENT AND METHOD FOR MEASURING THE OFFSET ANGLE OF A RESOLVER IN A SYNCHRONOUS ELECTRIC MACHINE

FIELD OF THE INVENTION

The present invention relates to rotating electric machines. The present invention is more particularly aimed at rotating electric machines provided with a resolver, or with any other sensor making it possible to measure an absolute angular position, and the present invention pertains to the initial adjustment of this sensor, for example a resolver.

PRIOR ART

When the shaft of an electric machine is equipped with a resolver, it drives the rotor of the resolver which produces at the output of the windings of its stator a set of alternating electrical signals, the characteristics of whose relative amplitude faithfully and instantaneously reflect the angular position of the rotor of the machine. In an auto-controlled electric machine, this signal is used to slave the current in the windings of the stator to the maintaining of an optimum angular discrepancy (typically in quadrature) between the rotating magnetic field in the stator and the magnetic field engendered between the poles of the rotor.

Patent application WO 2010/026159 may be cited as an example of such a rotating electric machine. The said rotating electric machine comprises a stator comprising a stator magnetic circuit which constitutes the active part of the stator. This magnetic circuit is traversed by notches which emerge in each of its terminal faces. The notches are filled with conductors which form windings in the magnetic circuit. Where the notches exit each axial end face of the magnetic circuit, the conductors are folded back, forming windings so as to pass from one notch to the next. The junctions inter-linking the windings are organized so as to form induction coils. The ends of the winding conductors are intended to be linked electrically with a connector or an appropriate junction box. The references hereinbelow are those used in the aforementioned patent application WO 2010/026159. The below-mentioned references referring to the drawings are those used in the aforementioned patent application. This electric machine comprises a resolver 160 mounted at an axial end of the machine. The resolver 160 comprises a fixed resolver stator 164 centred axially in a housing inside the carcass and a resolver rotor 162 mounted on the shaft 31 of the rotor of the machine, facing the resolver stator. The resolver stator 164 is locked in an axially and angularly fixed position in the said housing. The mounting device comprises a bearing for rotational adjustment of the angular position of the resolver rotor 162 on the shaft of the machine rotor 31 and a friction race 202 making it possible to keep the resolver rotor 162 stationary on the shaft 31 of the rotor of the machine in a chosen angular position.

An electric machine equipped with a resolver is also known in the prior art, from the documents US 2006/125439 or EP 1 796 257 A1. It is proposed to determine the resolver setup error by calculation. In document US 2006/125439, the calculation calls upon a phase difference estimator using parameters of the electric machine. However, the parameters of the machine are by nature variable, notably as a function of temperature, and in a non-linear manner of the state of saturation of the magnetic circuit. In document EP 1 796 257 A1, the estimation of the angle error given by the resolver calls upon various operations for processing the electric machine's phase signals. On the basis of the position of the rotor, optionally corrected, this document describes a stage for controlling the electric machine. Such approaches are therefore not precise and are very greedy in terms of calculation time.

In a synchronous machine, for example three-phase, with permanent magnets, the torque produced depends on the interaction between the rotor flux and the stator flux. The rotor flux being produced by the permanent magnets, the torque is adjusted by adjusting the stator flux for which two parameters are accessible: the amplitude of the flux, itself adjusted through the amplitude of the currents of the three-phase power supply system, and the phase of the stator flux with respect to the rotor flux. This phase is itself adjusted through the phase of the stator currents. At a given current amplitude, the maximum torque is obtained when the rotor flux is, to within hardly anything, in phase quadrature with respect to the stator flux. The amplitude of the currents is slaved by virtue of regulators which use the measurements of current sensors.

To be able to exactly adjust the phase of the currents, it is necessary to know the position of the motor rotor (therefore of the rotor flux) with respect to the stator coil. This is the function of the resolver which is a sensor making it possible to measure the absolute position of the resolver rotor over an electrical revolution. A resolver is itself made up of a stator and a rotor. The indication of the measurement depends on the relative position between resolver stator and resolver rotor. To a given reference position between machine rotor and machine stator there corresponds a reference value, for example zero, for the measurement of the rotor position. The resolver having been able to be installed in an arbitrary angular manner on the machine, there exists a difference between the indication of the resolver measurement and the reference value of the rotor position. Let us call this difference the "resolver setup error". It is necessary to know this resolver setup error in order to exactly know the position of the machine rotor flux and therefore be able to optimize the control of the machine. When this resolver setup error is known, two solutions exist for circumventing it: either software compensation, or mechanical adjustment of the relative position between resolver rotor and resolver stator in such a way that the indication of the measurement is actually zero. Let us call this operation respectively software setup of the resolver and mechanical setup of the resolver of the electric machine.

For the control of the electric machine and by convention, the "zero degrees" angular reference of the absolute position of the rotor of the machine over an electrical revolution occurs when the rotor poles of the machine (knowing that there may be one or more pairs of poles at the rotor, for example very often three pairs of poles in high-performance machines, thereby defining three electrical revolutions for one mechanical revolution) are aligned with the respective axes of the coil of phase A, that is to say one of the phases of the stator, the spatial position of which is quite obviously known through the construction of the coils. For this particular relative position between the rotor of the electric machine and the stator of the electric machine, it is therefore necessary to mechanically adjust the relative position between resolver rotor and resolver stator in such a way that the indication of the measurement is actually zero. Let us call this operation the setup of the resolver of the electric machine.

This setup operation exhibits the advantage that it is then possible, in an industrial object which uses such an electric machine and is mass-produced such as an automobile (for example the electric machine is a motor in an electric traction chain), to change the electric machine without having to undertake adjustments of parameters in the control software, to the benefit of the ease of maintenance of these vehicles.

The objective of the invention is to propose means which are useful for undertaking this setup of the resolver in an automatic and precise manner.

DISCLOSURE OF THE INVENTION

The resolver setup action requires two actions: it is necessary to be able to measure the resolver setup error and it is necessary to be able to mechanically adjust the relative position between resolver stator and rotor so as to reduce this resolver setup error to zero.

Assuming that we know the resolver setup error, that is to say the resolver rotor azimuth discrepancy, the correction of the position error can be done by locking the resolver rotor and by giving a train of pulses with the electric machine itself so as to rotate the resolver rotor on the shaft of the electric machine.

There is thus described hereinbelow a method for adjusting a resolver of an electric machine, the electric machine comprising a main stator and a main rotor, the main rotor being arranged on a shaft mounted rotatably with respect to the main stator, the resolver of the said machine comprising a resolver stator and a resolver rotor, the resolver stator being mounted on a support securely interlocked with the main stator and the resolver rotor being mounted on a support securely interlocked with the said shaft, the resolver stator and the resolver rotor being mounted facing one another and close to an axial end of the said machine, the resolver rotor being the adjustable element of the resolver and being mounted by friction on its support so that its relative angular position with respect to its support can be modified for adjustment by exerting a torque between the said resolver rotor and its support, the method comprising the following steps:
  (i) locking the resolver rotor with respect to the resolver stator,
  (ii) energizing the main stator so that the electric machine develops a correction torque making it possible to rotate the resolver rotor with respect to the shaft of the machine by a predetermined correction angle.

Coming back to the resolver setup error, under a first aspect, the invention proposes an installation for measuring the setup error of a resolver of an electric machine, the electric machine comprising a main stator and a main rotor, the main rotor being arranged on a shaft mounted rotatably with respect to the main stator, the resolver of the said machine comprising a resolver stator and a resolver rotor, the resolver stator being mounted on a support securely interlocked with the main stator and the resolver rotor being mounted on a support securely interlocked with the said shaft, the resolver stator and the resolver rotor being mounted facing one another, the measurement installation comprising a current controller for energizing the main stator, the said controller receiving the angle measurement $\alpha_m$ delivered by the resolver, the said controller comprising current regulators, preferably of PI type (proportional integral), receiving setpoint currents Id and Iq, delivering voltages Uq and Ud feeding a calculation unit performing an inverse Park transformation so as to apply appropriate current and voltage setpoints to the stator coils of the main stator, the said controller comprising a voltage regulator, preferably of PI type (proportional integral) linked to one of the current regulators and to an input giving a voltage setpoint ConsUd, the said voltage regulator regulating a voltage Ud and delivering an angle $\alpha_c$ of measurement of the setup error, the angle $\alpha_c$ being added to the angle measurement $\alpha_m$ delivered by the resolver so as to obtain the resolver angle $\alpha_r$ used by the controller.

Under another aspect, the invention proposes a method for measuring the setup error of a resolver of an electric machine, the electric machine comprising a main stator and a main rotor, the main rotor being arranged on a shaft mounted rotatably with respect to the main stator, the resolver of the said machine comprising a resolver stator and a resolver rotor, the resolver stator being mounted on a support securely interlocked with the main stator and the resolver rotor being mounted on a support securely interlocked with the said shaft, the resolver stator and the resolver rotor being mounted facing one another, the method using a current controller to energize the main stator, the said controller receiving the angle measurement $\alpha_m$ delivered by the resolver and receiving setpoint currents Id and Iq feeding a calculation unit performing an inverse Park transformation so as to apply appropriate current and voltage setpoints to the stator coils of the main stator, the said controller comprising a voltage regulator, preferably of PI (proportional integral) type regulating a voltage Ud and delivering a correction angle $\alpha_c$ added to the angle measurement $\alpha_m$ delivered by the resolver so as to obtain the resolver angle $\alpha_r$ used by the controller, the method comprising the following steps:
  (i) applying a current setpoint to the main stator until the electric machine attains a predetermined rotation speed,
  (ii) applying a zero current setpoint to the main stator,
  (iii) regulating the voltage Ud by varying the correction angle $\alpha_c$ and recording the value of the angle $\alpha_c = \alpha_{c0}$ when the voltage Ud is at zero.

Thus the invention makes it possible to carry out, in an automatic manner, a measurement of the resolver setup error. Let us point out that when the present account speaks of a resolver, it must be understood to include any other sensor making it possible to measure an absolute angular position of the rotor of an electric machine.

BRIEF DESCRIPTION OF THE FIGURES

Other characteristics and advantages of the invention emerge from the description given hereinafter with reference to the appended drawings which show, by way of nonlimiting example, an embodiment of the subject matter of the invention.

DESCRIPTION OF AN EXEMPLARY EMBODIMENT

Let us firstly set forth how it is possible to undertake the measurement of the setup error of the rotor of the resolver.

According to a conventional tactic, a constant current is injected for example into two phases of the stator coil. The rotor, which must be free in rotation, then takes a well defined equilibrium position, the rotor flux aligning naturally with the stator flux produced. For this equilibrium position of the rotor, it is known what ought to be the indication of the position measurement by the resolver and it is therefore possible to deduce therefrom the error between this envisaged measurement and the present measurement. It is this error that will have to be cancelled by the resolver setup operation.

This scheme exhibits the following drawbacks however. It is necessary to inject significant currents into the stator to obtain a rotor position that is actually well defined, hence potentially significant heating in the course of the setup procedure. For a multipole machine with p pairs of poles, there are p electrical revolutions per mechanical revolution, there are therefore as many equilibrium positions as pairs of poles. In practice, a dispersion may appear between these various positions, due for example, to manufacturing dispersion or to mechanical tolerances. To optimize the setup of a resolver, it would therefore be necessary to redo a measurement of the error, in accordance with the scheme set forth hereinabove, for each of the equilibrium positions corresponding to each of the electrical revolutions. This tactic is very lengthy.

The technique proposed by the invention and set forth hereinbelow utilizes a mathematical scheme well known to the person skilled in the art, namely the direct so-called "Park" transform (for passing from a three-phase coordinate frame (A; B; C) tied to the stator to a two-phase rotating coordinate frame (d; q) while also knowing the angular position $\Theta = \omega t + \alpha 0$ of the machine rotor with respect to the stator, or the inverse Park transform for passing from the Park coordinate frame (d; q) to the three-phase coordinate frame (A; B; C). The use of such transforms is conventional in the art and current controllers, constructed on this basis, for regulating the current (therefore the torque) of auto-controlled synchronous electric machines are available in the state of the art.

Figure 1:
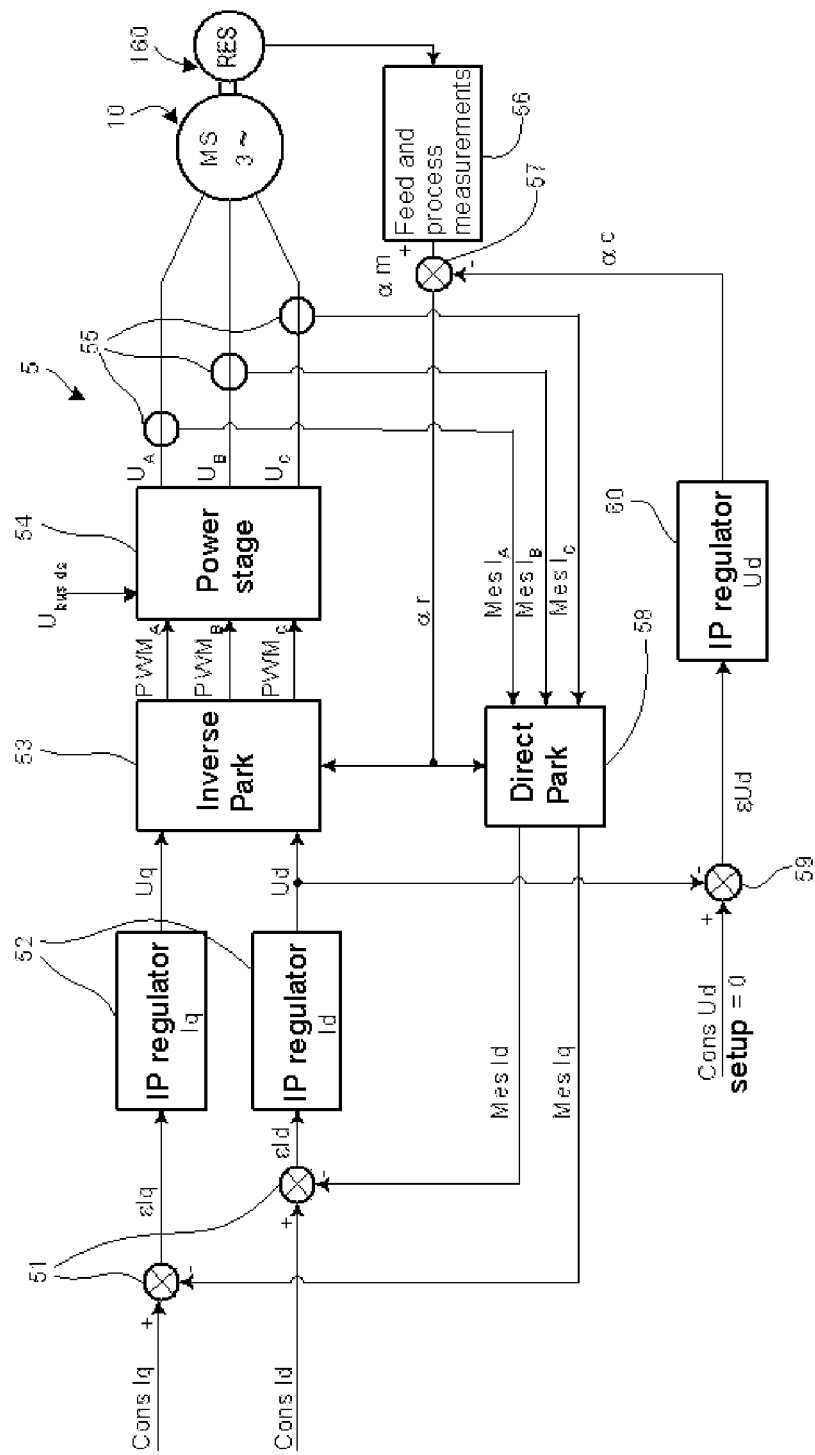
FIG. 1 is a simplified diagram of a controller in a calibration rig allowing the implementation of the method for measuring the offset of a resolver of an auto-controlled synchronous machine, according to the invention.

FIG. 1 shows a simplified diagram of an installation for measuring the setup error of a resolver 160 of an electric machine 10. It is seen that the measurement installation comprises a current controller 5 for energizing the main stator. The controller is designed to utilize the Park transformations, well known to the person skilled in the art. It is seen that the controller receives current setpoints ConsIq and ConsId; it comprises summators 51 receiving at the non-inverting input the said current setpoints ConsIq and ConsId and at the inverting input values termed MesId and MesIq. The way in which the latter are obtained will be seen hereinbelow. At the output of the summators 51, the controller comprises lines on which there circulate the discrepancies between the said current setpoints ConsIq and ConsId and the values termed MesId and MesIq, namely the values termed $\epsilon$Id and $\epsilon$Iq. These lines culminate at the input of PI (proportional integral) current regulators 52 delivering voltages, respectively the voltages Uq and Ud. Let us remark that the means of action of the PI current regulators 52 are the voltages Uq and Ud but it is in fact current regulators which have the effect of complying with the said current setpoints ConsIq and ConsId.

Shown next is a first calculation unit 53 comprising the elements and the programs making it possible to perform an inverse Park transform on the basis of the voltages Uq and Ud at the output of the PI current regulators 52, and on the basis of the rotor angle $\alpha_r$ measurement obtained as indicated hereinbelow. On these bases, as is well known per se by the person skilled in the art, the first calculation unit 53 is capable of delivering signals of electrical voltage setpoint, respectively $PWM_A$, $PWM_B$ and $PWM_C$, so as to be able to generate a balanced three-phase system of alternating voltages. A power stage 54 receives the setpoints $PWM_A$, $PWM_B$ and $PWM_C$ arising from the first calculation unit 53; it also receives a power line on which the electrical energy is available in the form of a DC voltage Ubus-dc. On these bases, the power stage 54 is capable of generating a balanced three-phase system of voltages, respectively $U_A$, $U_B$ and $U_C$, so as to energize each of the phases A, B and C of the electric machine 10. Current sensors 55 measure the currents of each of the phases, delivering respectively the values Mes $I_A$, Mes $I_B$ and Mes $I_C$. Let us remark that, when the electric machine is balanced, it is possible to use just two measurements, for example the measurements of the currents $I_A$ and $I_B$ and to calculate the current $I_C = -(I_A + I_B)$.

The current controller 5 also comprises a signal processing unit 56 making it possible to transform the electrical signals received from the resolver stator 160 into an angle measurement $\alpha_m$. Also shown is a summator 57 receiving at the non-inverting input the angle measurement $\alpha_m$ delivered by the processing unit 56 and, at the inverting input, an angle $\alpha_c$ of measurement of the setup error obtained as explained hereinbelow. In the summator 57 the angle $\alpha_c$ is deducted from the angle measurement $\alpha_m$ delivered by the resolver to obtain the rotor angle $\alpha_r$ used by the controller.

Finally, the current controller 5 comprises a second calculation unit 58 comprising the elements and the programs making it possible to perform a direct Park transform. On the basis of the currents measured on each of the phases, respectively the measurements Mes $I_A$, Mes $I_B$ and Mes $I_C$ and of the rotor angle $\alpha_r$, as known per se by the person skilled in the art, the second calculation unit 58 delivers the said values MesId and MesIq.

According to a noteworthy characteristic of the invention, the current controller 5 further comprises a PI voltage regulator 60, of PI (proportional integral) type, delivering an angle $\alpha_c$ intended to correct the setup error by regulating a setpoint value for the voltage Ud. The voltage Ud is conveyed to the inverting input of a summator 59, which receives at the non-inverting input a setpoint ConsUd. At the output of the summator 59, the voltage discrepancy $\epsilon$Ud feeds the PI voltage regulator 60.

Figure 3:
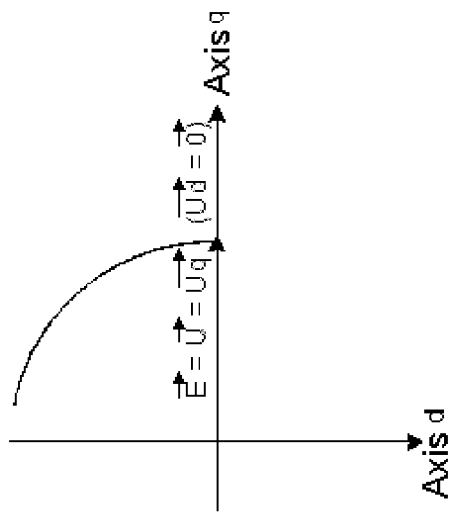
FIG. 3 is a simplified vector diagram pertaining to the electric machine of FIG. 2, after correction of the resolver setup error.
Figure 2:
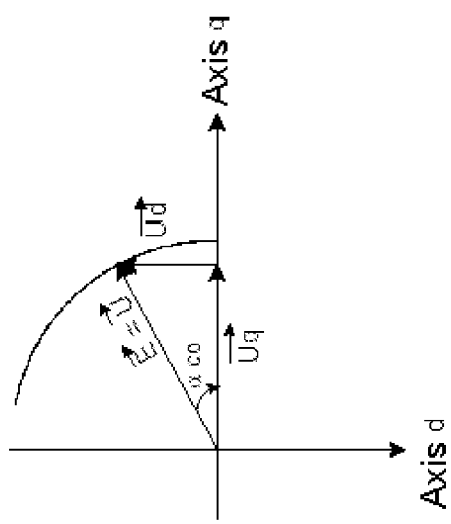
FIG. 2 is a simplified vector diagram pertaining to an electric machine rotating while idling (zero current) whose resolver comprises a resolver setup error.

The installation operates in the following manner. Let us first observe FIG. 2. The latter is a vector diagram, resulting from a direct Clark transformation, of an electric machine operating while idling (zero current) and whose resolver comprises an angle setup error $\alpha_{c0}$. The machine rotates at a speed such that it generates an electromotive force $\vec{E}$. Hence, to slave a zero current, the current controller 5, in which the PI voltage regulator 60 would be deactivated, generates a voltage $\vec{U}$ exactly identical in phase and amplitude to the electromotive force $\vec{E}$. This voltage $\vec{U}$ decomposes into voltages $\vec{Ud}$ and $\vec{Uq}$ on the two respective axes d and q of the Park coordinate frame. If a setup error exists, i.e., $\alpha c0$ is different from zero, the component $\vec{Ud}$ is present. If there is no setup error, i.e., $\alpha c0$ is zero, the component $\vec{Ud}$ is zero, the component $\vec{Uq}$ is equal to the voltage $\vec{U}$, which is itself equal to the electromotive force $\vec{E}$, all these voltages being in phase with the axis q of the Park coordinate frame: this is the case of FIG. 3.

In practice one proceeds in the following manner. The main rotor of the electric machine, which is mechanically free, is launched into rotation by injecting appropriate currents by virtue of the controller (described hereinabove and illustrated in FIG. 1), doing so until a certain rotation speed is attained. In order for the procedure to be precise, this speed must be sufficiently great for the dispersions in the determination of the voltages Ud and Uq by the PI current regulators 52 to be sufficiently small relative to the amplitude of the electromotive force E created by the rotation. When the desired rotation speed is attained, the current setpoints—ConsIq and ConsId—are fixed at 0. This results in a deceleration of the rotor of the electric machine, while "free wheeling". In this deceleration phase, the output of the PI current regulators 52 (in the drawing, the PI current regulators 52 for the current Iq and respectively for the current Id) which are respectively the voltages Uq and Ud will take the value necessary to exactly compensate the electromotive force of the electric machine and thus actually cancel out the current in the electric machine. As stated previously, in this situation, for a zero setup error, the component Ud ought to be zero.

The installation makes it possible, by virtue of the PI voltage regulator 60, to perform a software correction of the angle given by the resolver measurement in order to allow the controller to operate with the proper rotor position measurement reference. Under these conditions where the controller would operate with the proper rotor position measurement reference, the voltage Ud would be zero. Hence, if this setpoint ConsUd=0 is imposed at the input of the summator 59, a voltage discrepancy $\epsilon$Ud which represents the opposite of the voltage Ud is sent by the summator to the PI voltage regulator 60. During the deceleration phase, in an iterative manner (but quasi-continuously since the iteration period is of the order of 10 ms), the PI voltage regulator 60 will vary the angle $\alpha_c$ so as to reduce the voltage discrepancy $\epsilon$Ud. When the voltage discrepancy $\epsilon$Ud is zero, the angle $\alpha_c=\alpha_{c0}$ is obtained, which value is then stored and represents the setup error to be corrected mechanically subsequently (or of course still through software correction by storing for example this correction value in nonvolatile memory). In this state, that is to say after the software correction of the resolver setup error by the PI voltage regulator 60, the electric machine operates in the manner represented by FIG. 3. The voltage vector U is aligned with the axis q and equals Uq, the voltage Ud being zero.

Preferably, it is necessary to have obtained a measurement of the setup error well before the speed of the rotor vanishes, so as to have a sufficient electromotive force. In practice, the regulation of the voltage Ud is controlled in such a way as to attain zero while the rotation speed of the main rotor of the machine is still greater than a predetermined threshold. Therefrom ensues the precision of the measurement since the voltage on the axis d, for a setup error, will be all the larger the greater the electromotive force across the terminals of the electric machine.

According to a noteworthy characteristic of the invention, the method for measuring the setup error of a resolver of an electric machine therefore ends up by regulating the voltage Ud by varying the correction angle $\alpha_c$, and then the angle $\alpha_c=\alpha_{c0}$ is stored when the voltage Ud is at zero so as to be able to undertake the operation of correcting the position of the resolver rotor on the shaft of the electric machine since, from a software calibration, one wishes to pass to a mechanical correction of the electric machine.

Preferably, in the method for measuring the setup error of a resolver of an electric machine, the following steps are repeated: (i) applying a current setpoint to the main stator until the electric machine attains a predetermined rotation speed, (ii) applying a zero current setpoint to the main stator, and (iii) regulating the voltage Ud by varying the angle $\alpha_c$ of correction and recording the value of the angle $\alpha_c=\alpha_{c0}$ when the voltage Ud is at zero. And the mean of the values $\alpha_{c0}$ obtained is calculated. Furthermore and also preferably, steps (i), (ii) and (iii) cited hereinabove are repeated by rotating the electric machine in the opposite direction and the mean of the values $\alpha_{c0}$ obtained is calculated.

Preferably, it is necessary to precede steps (i), (ii) and (iii) cited in the previous paragraph by a first coarse estimation of the setup error obtained for example by injecting constant currents into two phases of the main stator so as to obtain an equilibrium position of the resolver rotor and to compare this equilibrium position with the theoretical alignment position for this injection of current. It would of course also be possible to inject a current into the 3 phases, the current of one of the three phase having a value +I and the currents of the other two phases having the value $-I/2$.

Let us point out that the same current controller 5 described hereinabove and illustrated in FIG. 1 is used to send a current into two phases of the stator so as to undertake a first coarse adjustment as will be explained hereinbelow. Current controller 5 in first-correction mode, electric machine stopped, the current controller 5 firstly injects a low current into two phases of the stator. In this step, the rotor aligns itself (through electromagnetic operation) but the electric machine does not start; its speed remains zero, there is rotation at the maximum of ½ an electrical revolution, so as to acquire the electromagnetic equilibrium position. Accordingly, without using the PI current regulators 52, fixed and opposite voltage setpoints are generated at the input of the power stage 54 for 2 phases whiles the $3^{rd}$ voltage setpoint is maintained at zero (PWMA=−PWMB and PWMC=0). This culminates in the generation of a constant current in the 2 phases A and B of the machine 10, this current depending on the setpoint applied, on the value of the dc bus voltage and the impedance of the coil of the machine.

It is the position $\alpha 1$ (one of its p (p is the number of pairs of poles) possible equilibrium positions). For this known position of rotor equilibrium, the position measurement originating from the resolver (via digital processing) ought to indicate a physical angle $\alpha 2$ corresponding to this position with two phases energized. The difference $\alpha 0=\alpha 2-\alpha 1$ is the initial offset of the resolver, compensated through software. This scheme is fairly traditional and it is not necessary to explain it in detail. Here, it is used only preferably and solely to obtain a first approximate coarse correction. Let us indicate simply, by referring in FIG. 2, that this scheme makes it possible to bring the vector U back to a position not too far from the axis q. Let us note that this scheme deals with only one pole whereas there may be dispersions of construction between poles, that it is therefore very approximate as not all the poles have been dealt with, but that it is used here only for a first coarse setup, to within about 10%.

This coarse setup allows us to apply current setpoints, respectively ConsIq and ConsId, capable of providing a sufficient torque to launch the motor at a sufficient speed and in the proper direction of rotation, indispensable prior to applying the more precise and more direct scheme for measuring the angle $\alpha_{c0}$, which was explained previously.

Let us now pass to the description of the correction of the setup error. The manner of correcting set forth hereinbelow is independent of the manner in which the measurement of the setup error has been obtained, that is to say as set forth hereinabove or in any other way.

Let us point out further that the same current controller 5 described hereinabove and illustrated in FIG. 1 will be used to send the train of correction pulses, after having possibly used it for a first coarse adjustment as explained hereinabove. Current controller 5 in final correction mode, the method comprising the following steps:
  (i) locking the resolver rotor with respect to the resolver stator,
  (ii) energizing the main stator so that the electric machine develops a correction torque making it possible to rotate the resolver rotor with respect to the shaft of the machine by a correction angle.

Furthermore, to exert the correction torque, it is proposed to proceed according to the following steps:
  (a) acquiring a measurement of the error in position angle of the resolver rotor with respect to the resolver stator,
  (b) calculating a train of correction torque pulses on the basis of the position error,
  (c) exerting the train of correction torque pulses,
  (d) acquiring a new measurement of the error in position angle of the resolver rotor with respect to the resolver stator,
  (e) repeating steps (b) to (d) above until the position error is less than a pre-established tolerance.

Figure 4:
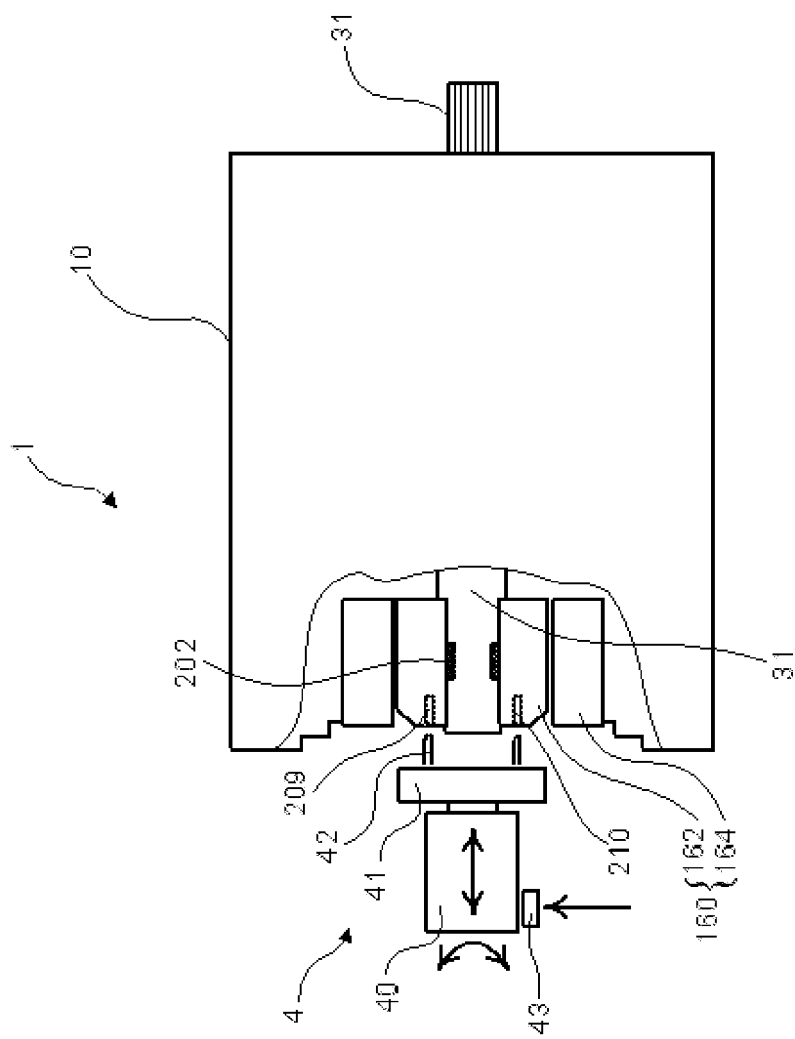
FIG. 4 represents in a schematic manner an adjustment rig for the implementation of the method for adjusting a resolver of an electric machine according to the invention.

FIG. 4 shows a rig 1 for correcting the setup error of a resolver of an electric machine. Each pulse of the train of pulses of step (c) hereinabove culminates in rotating the resolver rotor by a predetermined angle. The pulses and the predetermined angle may be determined in an experimental manner. At each pulse, the electric machine develops a motor rotation torque but, as the resolver rotor is locked mechanically with respect to the resolver stator, and as the amplitude of the rotation torque exceeds the torque due to the friction of the resolver rotor 162 on its support, that is to say on the stretch of the shaft 31 intended to receive the said resolver rotor 162, slippage is caused, that is to say a forced rotation of the resolver rotor 162 with respect to the shaft 31. In this way the adjustment of the resolver rotor 162 is performed progressively. The number of pulses is calculated by dividing the position angle error by the said predetermined angle. Preferably, the said predetermined angle is reduced at each iteration of the adjustment method.

FIG. 4 shows that the rig 1 receives and immobilizes (by means that are not represented) the synchronous electric machine 10 to be corrected. This machine comprises a main stator (not represented) and a main rotor (not represented) rotating with respect to the main stator and mounted on a shaft 31, a fluted end of which is shown, intended to be coupled with a mechanism driven by or driving the electric machine. This machine comprises a resolver stator 164 and a resolver rotor 162. The opposite end of the shaft 31 from the fluted end comprises a shoulder against which the resolver rotor 162 is applied. Between the shaft 31 and the resolver rotor 162 is housed a friction race 202 which, while admitting a relative slippage in rotation if the torque applied is sufficiently high, immobilizes the resolver rotor 162 on the shaft 31 at service loadings, that is to say during normal operation. This is one technological means, among others, making it possible to immobilize a resolver rotor on the shaft of the electric machine at service loadings while retaining a capability for adjusting the azimuth of the resolver rotor. The terminal face of the resolver rotor is furnished with two blind holes 209 and 210. Here again, this is one technological means, among others, making it possible to lock a resolver rotor with respect to the main stator of the electric machine so as to rotate the shaft 31 of the said electric machine without rotating the resolver rotor 162. For more details on these constructional arrangements, the reader is invited to refer to patent application WO 2010/026159.

The rig 1 for correcting the setup error also comprises a locking member 4 which comprises a head 41 comprising two pegs 42 shaped and positioned with respect to one another so as to be able to be inserted into the blind holes 209 and 210. The pegs 42 are mounted on the head 41 in an elastic manner, allowing them to sink somewhat into the latter if their end is pressed by a motion parallel to the axis of the rotor 31. The head 41 is mounted on an actuator 40 centred on the axis of the rotor 31 (also referred to as "shaft" herein) and capable of propelling the head 41 in the direction of the axis of the rotor 31 so as to move the head 41 towards or away from the resolver rotor 162, and capable of rotating the head 41 about the axis of the rotor 31 in such a way that, by combining a rotation motion of the head 41 and a translation motion of the latter, the pegs 42 can engage with the blind holes 209 and 210. The locking member 4 finally comprises a brake 43 making it possible to immobilize the actuator 40 and therefore the head 41.

Figure 5:
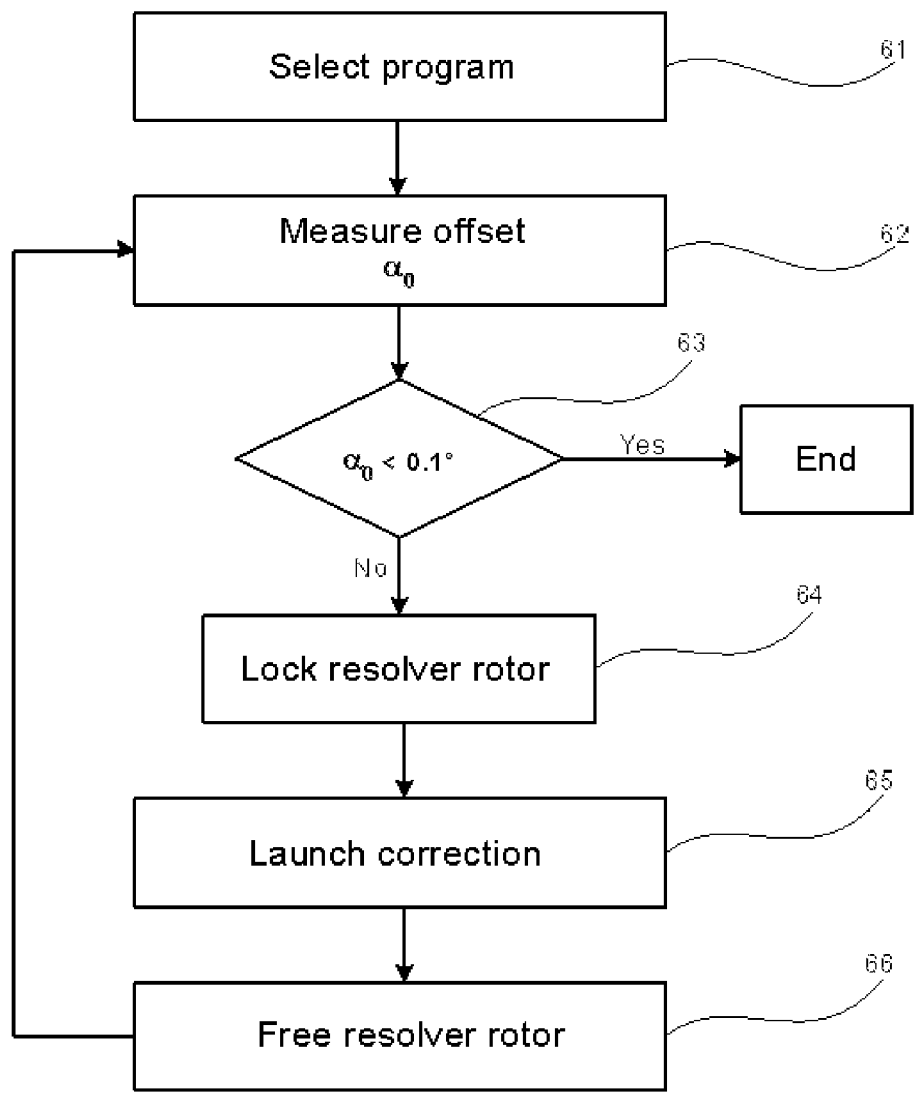
FIG. 5 is a functional diagram describing the method for adjusting a resolver of an electric machine according to the invention.

FIG. 5 is a functional diagram describing the method for adjusting a resolver of an electric machine according to the invention. Let us point out firstly that a rig 1 for correcting the setup error according to the invention preferably comprises an automaton making it possible to automate the operations. Such an automaton comprises in memory the parameters making it possible to process a whole range of electric machines. After having installed the electric machine whose resolver is required to be adjusted on the rig 1 for correcting the setup error, the operator selects the type of machine installed on the rig: shown is a first "program select" block 61 for selecting a program suited to the electric machine to be adjusted. This program allows automatic chaining of the operations described hereinbelow. Shown is a "measure offset $\alpha_{c0}$" block 62 for performing a measurement preferably by means of a measurement installation comprises a current controller 5 and a PI voltage regulator 60 delivering an angle $\alpha_{c0}$ of measurement of the setup error, as set forth hereinabove. Shown also is a test block 63 verifying whether $\alpha_{c0}$ (the position error of the resolver rotor) is less than a pre-established tolerance, here equal to 0.1°. If such is the case, the adjustment of a resolver is terminated (exit towards the "end" status). If such is not the case, the program chains through the "lock rotation of the resolver" block 64: referring to FIG. 4, this action consists in instructing firstly a fast approach of the head 41 towards the resolver rotor 162, and then a slow approach over the last few millimeters. Once in contact, a rotation of the head 41 is instructed, until the pegs 42, on account of their elastic mounting on the head 41, are inserted spontaneously into the blind holes 209 and 210. The resolver rotor 162 is then securely interlocked with the head 41, which is itself securely interlocked with the actuator. The actuator is thereafter immobilized by the brake 43, thereby immobilizing the head 41 and therefore also the resolver rotor 162.

Thereafter, the "launch correction" block 65 is seen: this operation consists in energizing the main stator of the electric machine so as to perform torque pulses, during a given time, by instructing the controller of the electric machine in an appropriate manner, as set forth hereinabove. Chaining continues thereafter through the "free resolver rotor" block 66 which consists in releasing the brake 43 and retracting the head 41. A new measurement is undertaken thereafter, by return to the "measure offset $\alpha_{c0}$" block 62, until the resolver rotor is set up within the agreed tolerance.

Once the angular setup of the resolver rotor has been performed, it is possible to undertake the final mounting of the electric machine in general by mounting a protection cowl such as described for example in the aforementioned patent WO 2010/026159.

The invention claimed is:

1. An apparatus for measuring a setup error of a resolver of an electric machine that includes a main stator and a main rotor, wherein the main rotor is arranged on a shaft mounted rotatably with respect to the main stator, wherein the resolver includes a resolver stator and a resolver rotor, wherein the resolver stator is mounted on a support securely interlocked with the main stator, wherein the resolver rotor is mounted on a support securely interlocked with the shaft, and wherein the resolver stator is mounted to face the resolver rotor, the apparatus comprising:
a current controller for energizing the main stator, wherein the current controller receives an angle measurement $\alpha_m$ from the resolver, and wherein the current controller includes:
current regulators, which receive setpoint currents Id and Iq, and which deliver voltages Uq and Ud to a calculator that performs an inverse Park transformation so as to apply appropriate current and voltage setpoints to stator coils of the main stator,
a voltage regulator, which is linked to one of the current regulators and to an input giving a voltage setpoint ConsUd,
wherein the voltage regulator regulates a voltage Ud and delivers an angle measurement $\alpha_c$ of the setup error, the angle measurement $\alpha_c$ being added to the angle measurement $\alpha_m$ from the resolver produce a resolver angle $\alpha_r$ used by the current controller.

2. An apparatus according to claim 1, wherein the current regulators are of a PI (proportional integral) type.

3. An apparatus according to claim 1, wherein the voltage regulator is of PI (proportional integral) type.

4. A method for measuring a setup error of a resolver of an electric machine that includes a main stator and a main rotor, the main rotor being arranged on a shaft mounted rotatably with respect to the main stator, the resolver of the electric machine including a resolver stator and a resolver rotor, the resolver stator being mounted on a support securely interlocked with the main stator, the resolver rotor being mounted on a support securely interlocked with the shaft, the resolver stator and the resolver rotor being mounted facing one another, the method comprising steps of:
(i) using a current controller to energize the main stator, the current controller receiving an angle measurement $\alpha_m$ delivered by the resolver and receiving setpoint currents Id and Iq feeding a calculation unit for performing an inverse Park transformation so as to apply appropriate current and voltage setpoints to stator coils of the main stator, wherein the current controller includes a voltage regulator for regulating a voltage Ud and delivering a correction angle $\alpha_c$ added to the angle measurement $\alpha_m$ delivered by the resolver so as to obtain a resolver angle $\alpha_r$ used by the current controller;
(ii) applying a current setpoint to the main stator until the electric machine attains a predetermined rotation speed;
(iii) applying a zero current setpoint to the main stator; and
(iv) regulating the voltage Ud by varying the correction angle $\alpha_c$ and recording a value of the angle $\alpha_c = \alpha_{c0}$ when the voltage Ud is zero.

5. The method according to claim 4, wherein the step (iv) of regulating the voltage Ud is controlled so as to attain zero while a rotation speed of the main rotor of the electric machine is greater than a predetermined threshold.

6. The method according to claim 4, wherein the steps (ii), (iii), and (iv) are repeated and a mean of the values of the angle $\alpha_c = \alpha_{c0}$ is calculated.

7. The method according to claim 4, wherein steps (ii), (iii), and (iv) are repeated by rotating the electric machine in an opposite direction and a mean of the values $\alpha_c = \alpha_{c0}$ is calculated.

8. The method according to claim 4, wherein prior to the steps (ii), (iii), and (iv) is a step of coarsely estimating a setup error by injecting currents into two phases of the main stator so as to obtain an equilibrium position of the resolver rotor, and comparing the equilibrium position with a theoretical alignment position for the injected currents.

9. The method according to claim 4, wherein the voltage regulator is of a PI (proportional integral) type.

* * * * *

UNITED STATES PATENT AND TRADEMARK OFFICE
CERTIFICATE OF CORRECTION

PATENT NO. : 8,933,655 B2
APPLICATION NO. : 13/698842
DATED : January 13, 2015
INVENTOR(S) : Cédric Savio et al.

It is certified that error appears in the above-identified patent and that said Letters Patent is hereby corrected as shown below:

Title Page,

ITEM (75) INVENTORS:

All instances, "Clermont-Ferrand Cedex" should read --Clermont-Ferrand Cedex 9--.

ITEM (73) ASSIGNEES:

"Establissements" should read --Etablissements--.

ITEM (57) ABSTRACT:

Line 2, "perform" should read --performs--.

In the Specification,

COLUMN 8

Line 19, "phase" should read --phases--; and
Line 34, "whiles" should read --while--.

COLUMN 10

Line 66, "return" should read --returning--.

Signed and Sealed this
First Day of September, 2015

Michelle K. Lee
*Director of the United States Patent and Trademark Office*

CERTIFICATE OF CORRECTION (continued)
U.S. Pat. No. 8,933,655 B2

In the Claims,

COLUMN 11

Line 32, "produce" should read --to produce--.